(12) United States Patent
Lum (10) Patent No.: US 7,938,450 B2
(45) Date of Patent: May 10, 2011

(54) INTEGRAL UNIVERSAL COUPLING ASSEMBLY FOR A FLUID DISTRIBUTION SYSTEM AND METHOD OF USING THE SAME

(75) Inventor: Ken Lum, Fresno, CA (US)

(73) Assignee: Grundfos Pump Corporation, Olathe, KS (US)

( * ) Notice: Subject to any disclaimer, the term of this patent is extended or adjusted under 35 U.S.C. 154(b) by 782 days.

(21) Appl. No.: 11/483,082

(22) Filed: Jul. 6, 2006

(65) Prior Publication Data

US 2008/0048445 A1  Feb. 28, 2008

(51) Int. Cl.
*F16L 25/00* (2006.01)
(52) U.S. Cl. ............... 285/12; 285/148.28; 285/405
(58) Field of Classification Search ............ 285/149.19, 285/368, 388, 139.1, 136.1, 133.4, 12, 412, 285/354, 416, 414, 415, 148.28, 405, 137.11, 285/139.3, 141.1, 142.1, 143.1, 148.19
See application file for complete search history.

(56) References Cited

U.S. PATENT DOCUMENTS

| | | | |
|---|---|---|---|
| 275,269 A * | 4/1883 | Reid ............... | 285/347 |
| 415,387 A * | 11/1889 | Hogan ............... | 165/96 |
| 473,462 A * | 4/1892 | Hogan ............... | 285/384 |
| 536,801 A * | 4/1895 | Gaghan ............. | 137/360 |
| 1,009,031 A * | 11/1911 | Millea ............... | 285/137.11 |
| 1,053,528 A * | 2/1913 | Mueller et al. ..... | 285/31 |
| 1,572,781 A * | 2/1926 | Farmer .............. | 285/38 |
| 2,234,119 A * | 3/1941 | Halliburton ........ | 285/328 |
| 2,826,436 A * | 3/1958 | Hupp et al. ........ | 285/288.1 |
| 2,828,978 A * | 4/1958 | Wurzburger ....... | 285/85 |
| 2,833,566 A * | 5/1958 | Meyer et al. ....... | 285/18 |
| 3,072,421 A * | 1/1963 | Lloyd et al. ........ | 285/189 |
| 3,224,795 A * | 12/1965 | Conley ............... | 285/114 |
| 3,486,771 A * | 12/1969 | Conlin ............... | 285/39 |
| 3,782,419 A | 1/1974 | Hanson | |
| 4,278,275 A | 7/1981 | Diederich, Jr. | |
| 4,403,795 A | 9/1983 | Davlin | |
| 4,416,575 A | 11/1983 | McCarthy | |
| 4,428,603 A | 1/1984 | Davlin | |
| 4,712,812 A | 12/1987 | Weir, III | |
| 4,854,613 A | 8/1989 | Reece et al. | |
| 4,887,850 A | 12/1989 | Albrecht | |
| 4,889,369 A | 12/1989 | Albrecht | |
| 4,977,917 A * | 12/1990 | Adams .............. | 137/597 |
| 5,000,488 A | 3/1991 | Albrecht | |
| 5,000,490 A | 3/1991 | Albrecht | |
| 5,000,492 A * | 3/1991 | Kemp ............... | 285/363 |

(Continued)

*Primary Examiner* — James M Hewitt
*Assistant Examiner* — Gwendolyn D Fournet
(74) *Attorney, Agent, or Firm* — The Small Patent Law Group LLC; Dean Small; Jay J. Hoette (57) ABSTRACT

A universal coupling assembly is provided including a housing having an inner bore that extends along an axis through a fluid port and a flange formed integral with the housing and the inner bore. The flange extends radially outward from the axis and has a mating surface. A nipple extends from the flange along the axis toward the fluid port. The nipple has a mating interface at an end thereof, and the nipple has a junction portion extending at least partially about the nipple and located between the mating interface and the flange. The junction portion and the mating interface are configured to receive at least two different types of interchangeable fittings based on a type of mating joint, and the junction portion is matable with one of a flange fitting, a threaded union fitting, a sweat fitting, an NPT fitting, and a barb fitting.

23 Claims, 7 Drawing Sheets

U.S. PATENT DOCUMENTS

| | | | |
|---|---|---|---|
| 5,018,769 A | 5/1991 | Albrecht | |
| 5,217,260 A | 6/1993 | Boticki | |
| 5,222,377 A * | 6/1993 | Squires | 62/292 |
| 5,338,075 A | 8/1994 | Albrecht | |
| 5,401,062 A | 3/1995 | Vowles | |
| 5,484,171 A * | 1/1996 | Emmins | 285/31 |
| 5,533,761 A | 7/1996 | Ostrander et al. | |
| 5,803,508 A * | 9/1998 | Lowella | 285/64 |
| 5,893,589 A * | 4/1999 | Bleitz et al. | 285/184 |
| 6,065,160 A | 5/2000 | Winn | |
| 6,129,390 A | 10/2000 | Ohlsson | |
| 6,755,445 B2 * | 6/2004 | Balamuta et al. | 285/357 |
| 7,055,863 B1 * | 6/2006 | Commeville et al. | 285/46 |
| 2003/0080563 A1 * | 5/2003 | Roberts et al. | 285/354 |
| 2004/0094952 A1 * | 5/2004 | Twardawski et al. | 285/210 |
| 2005/0104371 A1 * | 5/2005 | Atkinson | 285/133.11 |

* cited by examiner

INTEGRAL UNIVERSAL COUPLING ASSEMBLY FOR A FLUID DISTRIBUTION SYSTEM AND METHOD OF USING THE SAME

BACKGROUND OF THE INVENTION

The present invention generally relates to fluid coupling assemblies and more particularly to a fluid coupling assembly that supports interchangeable fittings of different types to be used based upon the type of mating joint to which the coupling assembly is to be connected.

Today a wide variety of coupling assemblies are used in fluid distribution systems. The coupling assemblies may be provided on different types of equipment such as pumps, valves, circulators, meters and the like. The coupling assemblies may be configured for use with different types of fluids, such as water, oil, fuel, sewage and the like. Examples of existing coupling types include flange type fittings, threaded union type fittings, sweat type fittings, National Pipe Thread (NPT) type fittings, barb type fittings and the like.

Heretofore, different applications have historically used certain types of couplings, regardless of whether such couplings were the most convenient for the application. Also, different geographic areas (e.g. different countries) have predominantly used different types of fittings for a common application. For example, in Europe, certain groundwater applications generally utilize one type of coupling (e.g. a threaded union fitting), while, in the United States, the same groundwater applications generally utilize a different type of coupling (e.g. a flange fitting).

Problems arise when using a coupling assembly to transition from a pipe using one type of fitting to a pipe using a different type of fitting. The problem most often encountered is that a user had to stock multiple types of coupling assemblies in order to transition between the various combinations of fitting types. Each type of transition included a separate and dedicated overall coupling assembly structure. Consequently, it was unduly expensive to fully stock a wide variety of couplings. For example, using the four fitting types identified above, ten different combinations of coupling assemblies could be encountered in the field. Carrying ten coupling assemblies is cumbersome and burdensome for the user.

In recent times, more interest has been given to simplify the structures and steps for installing fluid distribution systems and equipment. The growing interest to simplify these systems and equipment is due, in part, to the desire of contractors to improve efficiency and, in part, due to the interest of individuals to do more home repair and improvement themselves.

A need remains for an improved coupling assembly that may be used in different applications and with different types of mating connectors. It is an object of certain embodiments of the present invention to address the above concerns and other problems experienced in the past.

BRIEF DESCRIPTION OF THE INVENTION

In one aspect, a universal coupling assembly is provided including a housing having an inner bore that extends along an axis through a fluid port and a flange formed integral with the housing and the inner bore. The flange extends radially outward from the axis and has a mating surface. A nipple extends from the flange along the axis toward the fluid port. The nipple has a mating interface at an end thereof, and the nipple has a junction portion extending at least partially about the nipple and located between the mating interface and the flange. The junction portion and the mating interface are configured to receive at least two different types of interchangeable fittings based on a type of mating joint, and the junction portion is matable with one of a flange fitting, a threaded union fitting, a sweat fitting, an NPT fitting, and a barb fitting.

In another aspect, a universal coupling assembly is provided for coupling an inlet side mating joint and a discharge side mating joint. The coupling assembly includes a housing having an inlet side, a discharge side and an inner bore that extends along an axis between an inlet port at the inlet side and a discharge port at the discharge side. The coupling assembly also includes an inlet side coupling at the inlet side of the housing. The inlet side coupling has an inlet flange formed integral with the housing and the inner bore, and the inlet flange extending radially outward from the axis. The inlet side coupling further has an inlet nipple extending from the inlet flange along the axis toward the inlet port and having an inlet mating interface at an end thereof. The inlet mating interface is remote from the inlet flange. The inlet nipple further has an inlet junction portion extending at least partially between the inlet mating interface and the inlet flange. The inlet junction portion and the inlet mating interface are configured to receive at least two different types of interchangeable fittings based on a type of the inlet side mating joint, and the inlet junction portion is matable with one of a flange fitting, a threaded union fitting, a sweat fitting, an NPT fitting, and a barb fitting. The coupling assembly further includes a discharge side coupling at the discharge side of the housing. The discharge side coupling has a discharge flange formed integral with the housing and the inner bore, and the discharge flange extending radially outward from the axis. The discharge side coupling further has a discharge nipple extending from the discharge flange along the axis toward the discharge port and having a discharge mating interface at an end thereof. The discharge mating interface is remote from the discharge flange. The discharge nipple further has a discharge junction portion extending at least partially between the discharge mating interface and the discharge flange. The discharge junction portion and the discharge mating interface are configured to receive at least two different types of interchangeable fittings based on a type of the discharge side mating joint, and the discharge junction portion is matable with one of a flange fitting, a threaded union fitting, a sweat fitting, an NPT fitting, and a barb fitting.

In a further aspect, a method is provided of configuring a universal coupling assembly for installation into a fluid distribution system having a mating joint of a predetermined type of coupling. The method includes providing a housing having an inner bore that extends along an axis through a fluid port, and providing a universal coupling on the housing. The universal coupling includes a flange integrally formed with the housing and extending radially outward from the axis, and the universal coupling includes a nipple extending from the flange along the axis toward the fluid port. The nipple includes a mating interface at an end thereof, and the nipple includes a junction portion extending at least partially between the mating interface and the flange. The junction portion and the mating interface are configured to receive at least two different types of interchangeable fittings selected from the group comprising a flange fitting, a threaded union fitting, a sweat fitting, an NPT fitting, and a barb fitting. The method further includes selecting one of the interchangeable fittings based on the type of mating joint used in the fluid distribution system, and mounting the selected interchangeable fitting to the universal coupling.

DETAILED DESCRIPTION OF THE INVENTION

Figure 1:
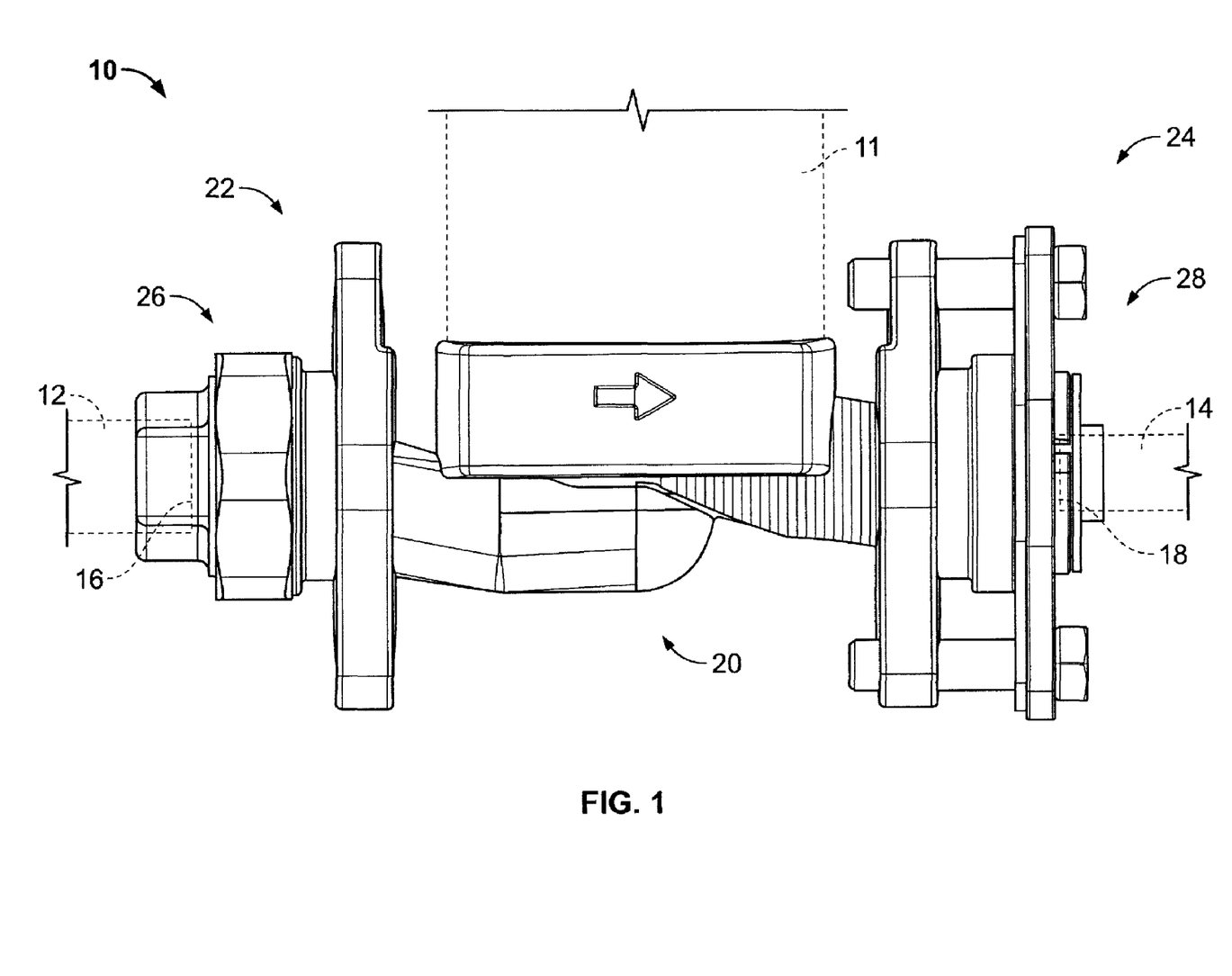
FIG. 1 is a front view of a universal coupling system formed in accordance with an embodiment of the present invention.

FIG. 1 is a front view of a universal coupling system 10 formed in accordance with an embodiment of the present invention. The coupling system 10 is used as a component in a fluid distribution system. The fluid distribution system is used to deliver a fluid, such as water, oil, fuel, sewage and the like, using a system of pipes (e.g. metal pipes). The coupling system 10 may be separately provided, or may be provided as part of an equipment system, such as a pump, a valve, a circulator, a meter, and the like, used within the fluid distribution system. In the illustrated embodiment, the coupling system 10 is part of a pump equipment system, and a pump 11 is shown generically in phantom in FIG. 1.

The coupling system 10 is coupled between at least two pipes of the fluid distribution system for delivering the fluid from an inlet or upstream pipe 12 to a discharge or downstream pipe 14 (both shown in phantom in FIG. 1). The upstream and downstream pipes 12 and 14 terminate at inlet side and discharge side mating joints 16 and 18, respectively. The mating joints 16 and 18 are configured to be joined to a corresponding particular type of fitting, such as a flange fitting, a threaded union fitting, a sweat fitting, an NPT fitting, a barb fitting and the like. In one embodiment, the mating joints 16 and 18 are of the same type and are to be joined to the same type of fitting. Alternatively, the mating joints 16 and 18 are of different types and are to be joined to different types of fittings. The universal coupling system 10 is able to mate with at least two different types of fittings, such that the coupling system 10 can interconnect pipes having mating joints 16 and 18 of the same or different types. In an exemplary embodiment, the universal coupling system 10 is able to interconnect mating joints that mate with any of a flange fitting, a threaded union fitting, a sweat fitting, an NPT fitting, a barb fitting and the like.

The coupling system 10 includes a body or housing 20 extending between an inlet side 22 and a discharge side 24. In the illustrated embodiment, the housing 20 represents a volute. The inlet pipe 12 is generally terminated to the inlet side 22 of the coupling system 10 and the discharge pipe 14 is generally terminated to the discharge side 24 of the coupling system 10. In the exemplary embodiment, the coupling system 10 includes an inlet side fitting assembly 26 and a discharge side fitting assembly 28, each of which are separately provided from the housing 20 and configured to be joined or coupled to the housing 20 at the inlet side 22 and the discharge side 24, respectively. The type of couplings used for the inlet side fitting assembly 26 and the discharge side fitting assembly 28 are selected based on the type of mating joints or mating fittings 16 and 18 provided.

The inlet side fitting assembly 26 represents a threaded union fitting. Optionally, the inlet side fitting assembly 26 may be a different type of fitting, such as a flange fitting, a sweat fitting, an NPT fitting, a barb fitting and the like. The discharge side fitting assembly 28 represents a flange fitting. Optionally, the discharge side fitting assembly 28 may be a different type of fitting, such as a threaded union fitting, a sweat fitting, an NPT fitting, a barb fitting and the like. While two different types of fittings are illustrated at the inlet and discharge side fitting assemblies 26 and 28, respectively, optionally the fittings may be the same type. The various types of fittings may be coupled to the inlet and discharge side fitting assemblies 26 and 28 without the need for changing the inlet side 22 or the discharge side 24 of the coupling system 10. As such, the coupling system 10 functions as a universal coupling system that accommodates multiple types of fittings for interconnecting multiple types of pipes. An individual may use the coupling system 10 to accommodate many combinations of piping systems, thus reducing the number of couplings or fittings that the individual must stock. Additionally, the coupling system 10 simplifies the structures of, and steps for installing, fluid distribution systems and plumbing.

Figure 2:
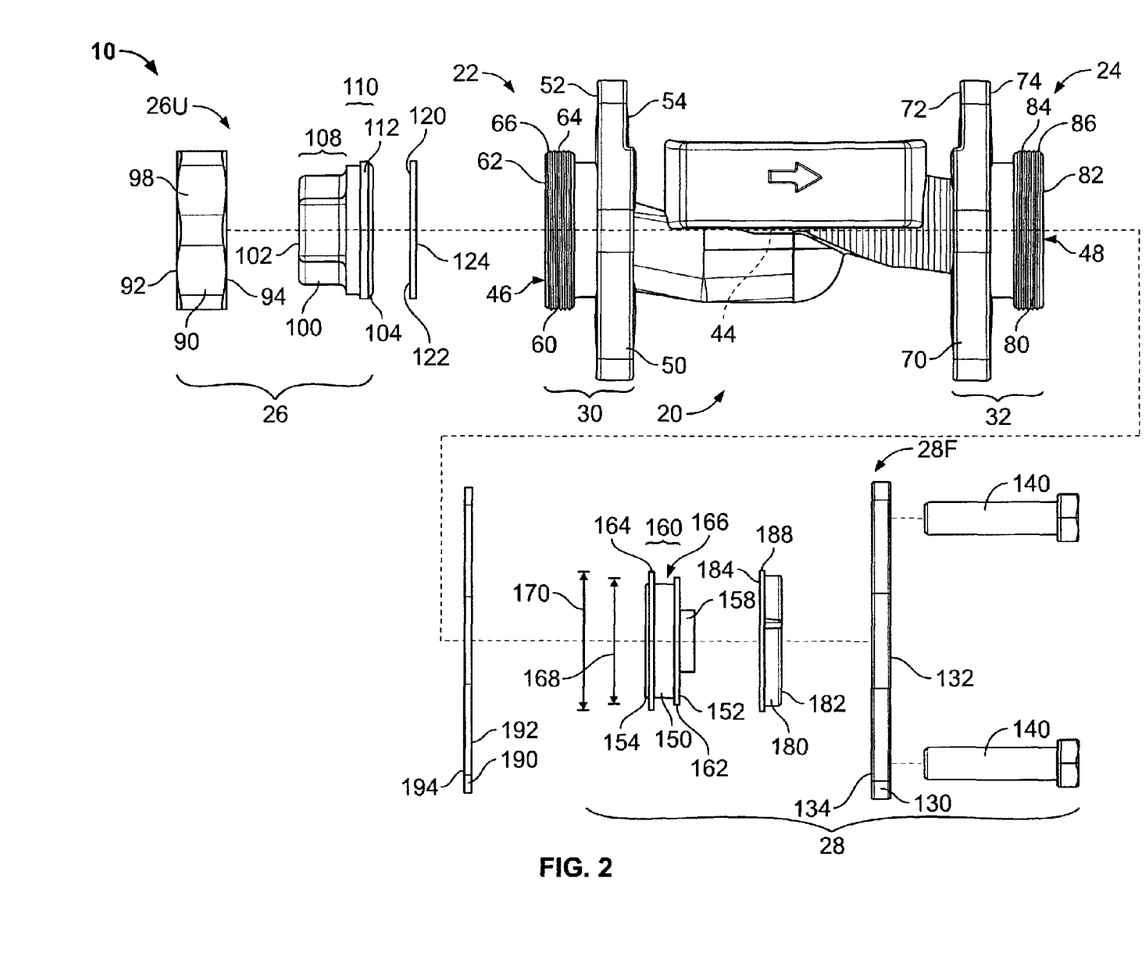
FIG. 2 is an front exploded view of the coupling system shown in FIG. 1 including two different types of couplings.

FIG. 2 is a front exploded view of the coupling system 10 including two different types of fittings for the inlet and discharge side fitting assemblies 26 and 28. The fitting assemblies 26 and 28 are configured to be joined to an inlet side coupling 30 and a discharge side coupling 32 of the coupling system 10. The inlet side coupling 30 extends from the inlet side 22 of the housing 20 and the discharge side coupling 32 extends from the discharge side 24 of the housing 20. Optionally, the inlet and discharge side couplings 30 and 32 may be substantially identical to one another. The inlet and discharge side couplings 30 and 32 are integrally formed with the housing 20. Optionally, the inlet and discharge side couplings 30 and 32 and the housing 20 may be formed by a casting process from a metal material. Alternatively, the inlet and discharge side couplings 30 and 32 and the housing 20 may be formed by another process, such as a milling or machining process or a molding process. The inlet and discharge side couplings 30 and 32 may be separately provided from the housing 20, and may be joined or coupled to the housing 20.

Figure 3:
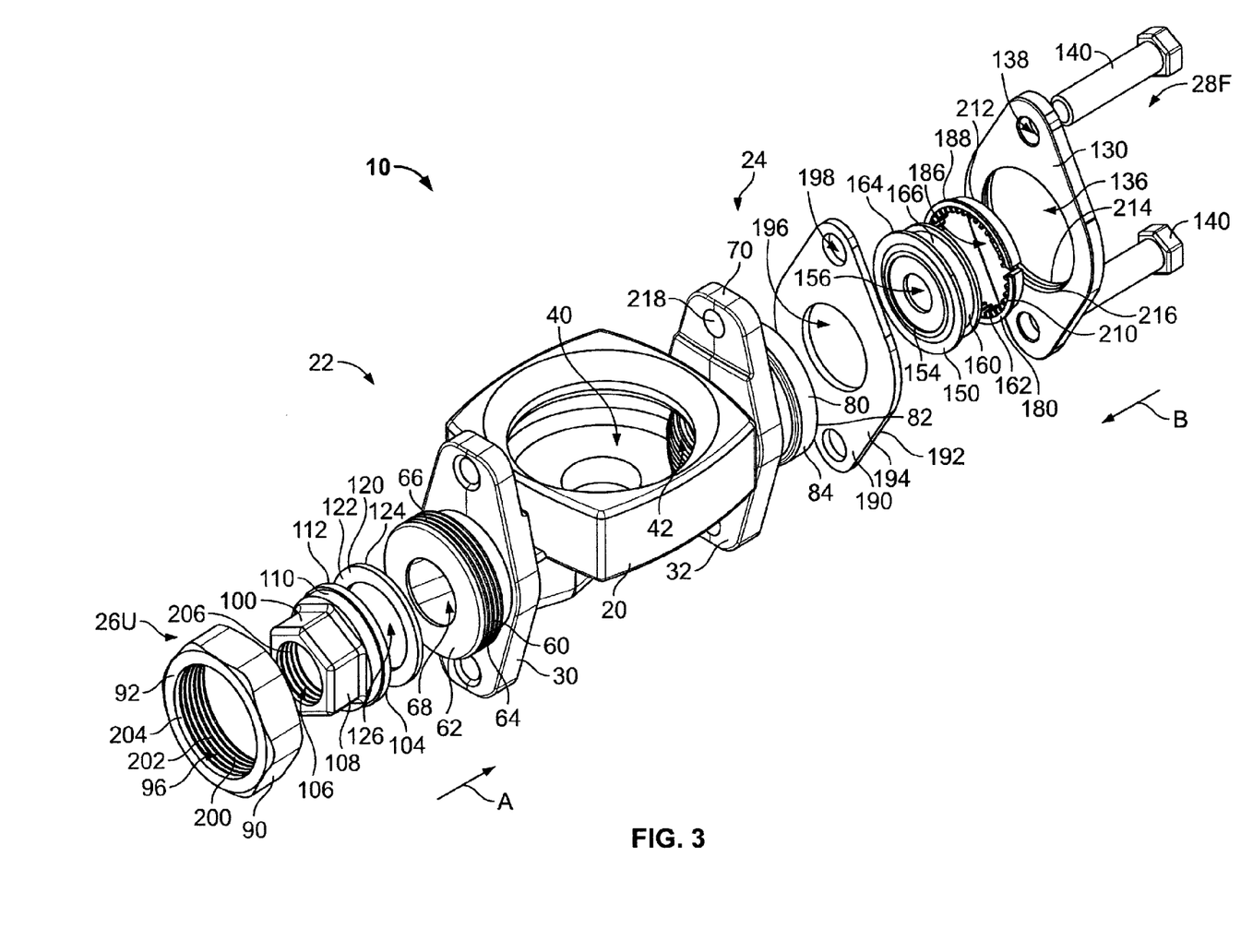
FIG. 3 is a exploded perspective view of the coupling system of FIG. 1.

The housing 20 includes an open cavity 40 (shown in FIG. 3) for receiving the pump 11 (shown in FIG. 1) and an inner bore 42 (also shown in FIG. 3). The inner bore 42 extends generally along an axis 44 between an inlet port 46 at the inlet side 22 and a discharge port 48 at the discharge side 24. Optionally, the inner bore 42 may open to the cavity 40 such that the inner bore 42 is in fluid communication with the pump 11. The inner bore 42 may have a substantially equal cross-sectional area along the length of the inner bore 42. Alternatively, the cross-sectional area of the inner bore 42 may change along the length. For example, the cross-sectional area may decrease from the inlet side 22 to the outlet side 24. Optionally, the inner bore 42 may have a substantially equal cross-sectional area along a first portion of the inner bore 42 from the inlet port 46 to the portion of the inner bore 42 that opens to the cavity 40, and a different, smaller, substantially equal cross-sectional area along a second portion of the inner bore 42 from the portion of the inner bore 42 that opens to the cavity 40 to the discharge port 48. The inner bore 42 may be generally circular. Alternatively, the inner bore 42 may have a variety of shapes and sizes along its length. The inner bore 42 may be substantially linear from the inlet port 46 to the discharge port 48. Alternatively, as in the illustrated embodiment, the inner bore 42 may be non-linear or curvilinear, such as in an S-shape, a sinusoidal shape, a wave shape, and the like.

The inlet side coupling 30 includes a flange 50 extending axially between an upstream side 52 and a downstream side 54. The flange 50 also extends radially outward from the axis 44. The flange 50 is used for coupling at least one type of inlet side fitting assembly 26, such as a flange fitting similar to the flange fitting 28F illustrated in FIG. 2, to the housing 20 during mating of the fitting assembly 26 and the coupling 30.

The inlet side coupling 30 includes a nipple 60 extending axially outward from the upstream side 52 of the flange 50 to the inlet port 46. The nipple 60 includes a mating interface 62 at an exposed end thereof. The nipple 60 further includes a junction portion 64 extending at least partially between the mating interface 62 and the flange 50. The junction portion 64 and the mating interface 62 are used for coupling at least one type of inlet side fitting assembly 26, such as a threaded union fitting, to the housing 20 during mating of the fitting assembly 26 and the coupling 30. Optionally, the junction portion 64 may be threaded for receiving a corresponding threaded portion of the fitting assembly 26. Optionally, an outer surface 66 of the junction portion 64 may be threaded. An inner surface 68 (shown in FIG. 3) of the junction portion 64 may also be threaded.

The discharge side coupling 32 includes a discharge flange 70 extending axially between an upstream side 72 and a downstream side 74 which represents a mating surface 74 of the discharge flange 70. The discharge flange 70 also extends radially outward from the axis 44. The discharge flange 70 is used for coupling at least one type of discharge side fitting assembly 28, such as a flange fitting, to the housing 20 during mating of the fitting assembly 28 and the coupling 32.

The discharge side coupling 32 includes a discharge nipple 80 extending axially from the downstream side 74 of the discharge flange 70. Optionally, the discharge nipple 80 may extend axially downstream from the discharge port 48. The discharge nipple 80 includes a mating interface 82 at an exposed end thereof. Optionally, the mating interface 82 may surround the discharge port 48. Alternatively, the mating interface 82 may be remote from the discharge port 48. The discharge nipple 80 further includes a discharge junction portion 84 extending at least partially between the mating interface 82 and the discharge flange 70. The discharge junction portion 84 and the mating interface 82 are used for coupling at least one type of discharge side fitting assembly 28, such as a threaded union fitting, to the housing 20 during mating of the fitting assembly 28 and the coupling 32. Optionally, the discharge junction portion 84 is threaded for receiving a corresponding threaded portion of the fitting assembly 28. An outer surface 86 of the discharge junction portion 84 may be threaded, and/or an inner surface (not shown) of the junction portion 84 may also be threaded.

An exemplary embodiment of one type of inlet side fitting assembly 26 is illustrated in FIG. 2 as a threaded union-type fitting assembly, and will generally be designated by the reference numeral 26U. Other types of fitting assemblies 26 may be joined to the housing 20, particularly the inlet side coupling 30 of the housing 20, without changes to the housing 20.

The union-type fitting assembly 26U includes a union nut 90 having a first side 92, a second side 94 opposite the first side 92 and an opening 96 (shown in FIG. 3) extending therebetween, wherein the second side 94 represents a mating surface 94 of the union nut 90. The second side 94 generally faces the coupling 30 and interfaces with the mating interface 62 of the coupling 30 during assembly. The second side 94 is substantially parallel to the first side 92. The union nut 90 includes an outer surface 98 having a series of flat portions joined to one another such that the union nut 90 has a hexagon shape. The flat portions are used during tightening of the union nut using a tool, such as a wrench.

The union-type fitting assembly 26U includes a tail piece 100 having a first side 102, a second side 104 opposite the first side 102 and an opening 106 (shown in FIG. 3) extending therebetween, wherein the second side 104 represents a mating surface 104 of the tail piece 100. The second side 104 generally faces the coupling 30. The second side 104 is substantially parallel to the first side 102. Optionally, the tail piece 100 may be abuttingly received within the opening 96 of the union nut 90 during assembly of the union-type fitting assembly 26U, as will be explained in detail below. The tail piece 100 includes a nut portion 108 having a series of flat portions joined to one another such that the nut portion 108 has a hexagon shape. The flat portions are used to tighten the tail piece 100 to the mating joint 16 (shown in FIG. 1) using a tool, such as a wrench. The nut portion 108 extends axially from the first side 102 toward the second side 104. A retaining portion 110 extends axially between the nut portion 108 and the second side 104. The retaining portion 110 includes a rim 112 extending radially outward. The rim 112 is the radially largest portion of the tail piece 100 and is used to abuttingly retain the tail piece 100 within the union nut 90 during assembly of the union-type fitting assembly 26U, as will be explained in detail below.

The union-type fitting assembly 26U includes a gasket 120 having a first side 122, a second side 124 opposite the first side 122 and an opening 126 (shown in FIG. 3) extending through the gasket 120. The gasket 120 is positioned between the tail piece 100 and the mating interface 62 of the coupling 30. The first side 122 generally faces the second side 104 of the tail piece 100 and the second side 124 generally faces the coupling 30.

An exemplary embodiment of one type of discharge side fitting assembly 28 is illustrated in FIG. 2 as a flange-type fitting assembly, and will generally be designated by the reference numeral 28F. Other types of fitting assemblies 28 may be joined to the housing 20, particularly the discharge side coupling 32 of the housing 20, without changes to the housing 20.

The flange-type fitting assembly 28F includes a fitting flange 130 having a first side 132, a second side 134 opposite the first side 132 and an opening 136 (shown in FIG. 3) extending therebetween, wherein the second side 134 represents a mating surface 134 of the fitting flange 130. The second side 134 generally faces the coupling 32 and interfaces with the mating interface 82 of the coupling 32 during assembly. The second side 134 is substantially parallel to the first side 132. The fitting flange 130 includes fastener bores 138 (shown in FIG. 3) extending therethrough for receiving fasteners 140. The fasteners couple the fitting flange 130 to the discharge flange 70.

The flange-type fitting assembly 28F includes a tail piece 150 having a first side 152, a second side 154 opposite the first side 152 and an opening 156 (shown in FIG. 3) extending therebetween, wherein the second side 154 represents a mating surface 154 of the tail piece 150. The second side 154 generally faces the coupling 32. The second side 154 is substantially parallel to the first side 152. The tail piece 150 is abuttingly received within the opening 136 of the flange fitting 130 during assembly of the flange-type fitting assembly 28F, as will be explained in detail below. Optionally, the tail piece 150 may include a junction portion 158 positioned at the first side 152. The junction portion 158 may be used in joining the fitting assembly 28 to the mating joint 18 of the downstream pipe 14 (shown in FIG. 1). Optionally, the junction portion 158 may include a sweat-type fitting. Alternatively, the junction portion 158 may include a threaded union-type fitting or an NPT-type fitting.

The tail piece 150 also includes a retaining portion 160 extending at least partially between the first and second sides 152 and 154. The retaining portion 160 includes a first rim 162 extending radially outward and a second rim 164 extending radially outward. The first and second rims 162 and 164 are spaced apart such that a gap 166 is formed therebetween. The first rim 162 has a first diameter 168 and the second rim 164 has a second diameter 170 that is larger than the first diameter 168. The first rim 162 is positioned proximate the first side 152 and the second rim 164 is positioned proximate the second side 154. The second rim 164 is the radially largest portion of the tail piece 150 and is used to abuttingly retain the tail piece 150 within the fitting flange 130 during assembly of the flange-type fitting assembly 28F, as will be explained in detail below.

The flange-type fitting assembly 28F includes a captive ring 180 having a first side 182, a second side 184 opposite the first side 182 and an opening 186 (shown in FIG. 3) extending through the captive ring 180. The captive ring 180 is sized and shaped to fit within the gap 166 between the first and second rims 162 and 164 of the tail piece 150. Optionally, the captive ring 180 may include a lip 188 disposed at the second side 184 of the captive ring 180. The ring is configured to be positioned between the fitting flange 130 and the tail piece 150 to isolate the two components from one another, as will be described in more detail below.

The flange-type fitting assembly 28F includes a gasket 190 having a first side 192, a second side 194 opposite the first side 192 and an opening 196 (shown in FIG. 3) extending through the gasket 190. The gasket 190 is positioned between the tail piece 150 and the mating interface 62 of the coupling 32. The first side 192 generally faces the second side 154 of the tail piece 150 and the second side 134 of the fitting flange 130. The second side 194 generally faces the coupling 32. Optionally, the gasket 190 may include fastener bores 198 (shown in FIG. 3) for receiving the fasteners 140. The fastener bores 198 are substantially aligned with the fastener bores 138 in the fitting flange 130.

FIG. 3 is an exploded perspective view of the coupling system 10. An exemplary assembly process of the coupling system 10 will be described with reference to FIG. 3. As indicated above, the housing 20 is provided with the inlet side coupling 30 and the discharge side coupling 32. The couplings 30 and 32 may be integrally formed with the housing 20 or the couplings 30 and 32 may be separately provided and joined to the housing 20. The junction portions 64 and 84 and the mating interfaces 62 and 82 of the couplings 30 and 32, respectively, are able to receive at least two different types of interchangeable fitting assemblies selected from the group including a flange fitting assembly, a threaded union fitting assembly, a sweat fitting assembly, an NPT fitting assembly, and a barb fitting assembly. The inlet side coupling 30 receives a union-type fitting assembly 26U and the discharge side coupling 32 receives a flange-type fitting assembly 28F. The type of fitting assembly is selected based on the type of mating joint 16 or 18 (shown in FIG. 1) used in the fluid distribution system. Once selected, the fitting assemblies 26U and 28F are mounted to the universal coupling assembly 10. Additionally, once the fitting assemblies 26U and 28F are mounted to the coupling assembly 10, the coupling assembly 10 is positioned within the fluid distribution system by coupling the fitting assemblies 26U and 28F to the mating joints 16 and 18, respectively.

An exemplary mounting process for the union-type fitting assembly 26U includes the following steps. The gasket 120 is positioned along the coupling 30 such that the second side 124 abuts the mating interface 62 of the nipple 60. Then the tail piece 100 is positioned against the gasket 120 such that the second side 104 of the tail piece 100 abuts the first side 122 of the gasket 120. The gasket 120 forms a fluid tight seal between the coupling 30 and the tail piece 100 once the fitting assembly 26U is mounted to the coupling 30. Optionally, the perimeter of the gasket 120 and the perimeter of the tail piece 100 coincide. Additionally, the gasket 120 and the tail piece 100 may substantially cover the mating interface 62.

Once the gasket 120 and the tail piece 100 are positioned, the union nut 90 is mounted to the nipple 60. The nut portion 108 of the tail piece 100 extends through the opening 96 in the union nut 90 during this assembly step. The union nut 90 includes a threaded portion 200 along an inner surface 202 of the union nut 90. The threaded portion 200 is threadably coupled to the threaded outer surface 66 of the junction portion 64. As the union nut 90 is tightened to the nipple 60, an annular rib 204 of the union nut 90 engages the rim 112 of the tail piece 100. The annular rib 204 is located on the inner surface 202 of the union nut 90 proximate the first side 92 thereof. The diameter of the annular rib 204 is smaller than the diameter of the rim 112 but larger than the diameter of the nut portion 108 and the forward part of the retention portion 110. As the union nut 90 is tightened, the union nut 90 pulls the tail piece 100 toward the gasket 120 and the nipple 60, in the direction of arrow A, to a final assembly position. In the final assembly position, the gasket 120 is sealingly positioned between the tail piece 100 and the nipple 60. The nut portion 108 is exposed at the inlet side 22 for joining to the mating joint 16. For example, an inner surface 206 of the nut portion 108 may be threaded for mating with the mating joint 16.

In an alternative assembly process, the tail piece 100 may be loaded into the opening 96 of the union nut 90 such that the annular rib 204 of the union nut 90 engages the rim 112 of the tail piece 100 prior to mounting the union nut 90 to the nipple 60.

An exemplary mounting process for the flange-type fitting assembly 28F includes the following steps. The gasket 190 is positioned along the coupling 32 such that the second side 194 abuts the mating interface 82 of the nipple 80. Then the tail piece 150 is snugged against the gasket 190 such that the second side 154 of the tail piece 150 abuts the first side 192 of the gasket 190. The gasket 190 forms a fluid tight seal between the coupling 32 and the tail piece 150 once the fitting assembly 28F is mounted to the coupling 32.

Once the gasket 190 and the tail piece 150 are positioned, the captive ring 180 is placed into the gap 166 such that the lip 188 engages the second rim 164. The captive ring 180 includes a substantially non-compressible, non-electrically conductive body. The captive ring 180 is manufactured from a material which is resistant to plastic flow under compressive forces. By way of example only, such material would include glass fiber, a hard rubber, or a hard plastic. The inner diameter of the captive ring 180 is smaller than the diameter 168 (shown in FIG. 2) of first rim 162. Therefore, captive ring 180 may be split, as shown in FIG. 3, to facilitate its installation over the first rim 162. One configuration for the captive ring 180 is generally "L-shaped" in cross-section, as partially defined by the lip 188. Another configuration for the captive ring 180 is generally "T-shaped" such that the captive ring 180 is elevated from the surface of the retaining portion 160.

Optionally, the captive ring 180 includes multiple teeth 210 extending radially inward from the body. At the teeth 210, the captive ring 180 has a generally T-shape. At the portions between the teeth 210, the captive ring 180 has a generally L-shape. Optionally, the side of captive ring 180 opposite the lip 188 may include a circumferential retainer barb 212 extending radially outward from the body. The retainer barb 212 may engage the fitting flange 130 after assembly. It is realized that the captive ring 180 may be installed into the gap 166 prior to snugging the tail piece 150 against the gasket 190.

Once the captive ring 180 is installed and the tail piece 150 is positioned against the gasket 190, the fitting flange 130 is mounted to the nipple 80. The tail piece 150 extends through the opening 136 in the fitting flange 130 during this assembly step. Optionally, the fitting flange 130 may include an annular rib 214 extending along an inner surface 216 of the opening 136 through the fitting flange 130. The annular rib 214 has a diameter that is greater than the diameter 168 of the first rim 162 of the tail piece 150 but smaller than the diameter 170 (shown in FIG. 2) of the second rim 164 of the tail piece 150. Optionally, the diameter of the annular rib 214 may be substantially equal to the diameter of the captive ring 180 such that the fitting flange 130 slides along the captive ring 180 to the lip 188. The annular rib 214 engages the lip 188 which defines a stop. At this point, the fitting flange 130 and the tail piece 150 are fully mated with one another. Once fully mated, the fitting flange 130 may be coupled to the discharge flange 70 using the fasteners 140. Optionally, the fasteners 140 may be threaded and are threadably coupled to threaded openings 218 in the discharge flange 70. As the fasteners 140 are tightened, the fitting flange 130 pulls the tail piece 150 toward the gasket 190 and the nipple 80, in the direction of arrow B, to a final assembly position. In the final assembly position, the gasket 190 is sealingly positioned between the tail piece 150 and the nipple 80, and the junction portion 158 (shown in FIG. 2) of the tail piece 150 is exposed at the discharge side 24 for joining to the mating joint 18.

In an alternative assembly process, the tail piece 150 and captive ring 180 may be loaded into the opening 136 of the fitting flange 130 such that the annular rib 214 of the fitting flange engages the lip 188 of the captive ring 180 prior to mounting the fitting flange 130 to the nipple 80. Alternatively, no captive ring 180 is used between the fitting flange 130 and the tail piece 150. Rather, the annular rib 214 directly engages the second rim 164 of the tail piece 150.

Once assembled, the coupling system 10 provides fluid flow from the inlet pipe 12 to the discharge pipe 14. Additionally, by aligning all of the openings in the components with the inner bore 42, a continuous flow of fluid may be provided.

Figure 4:
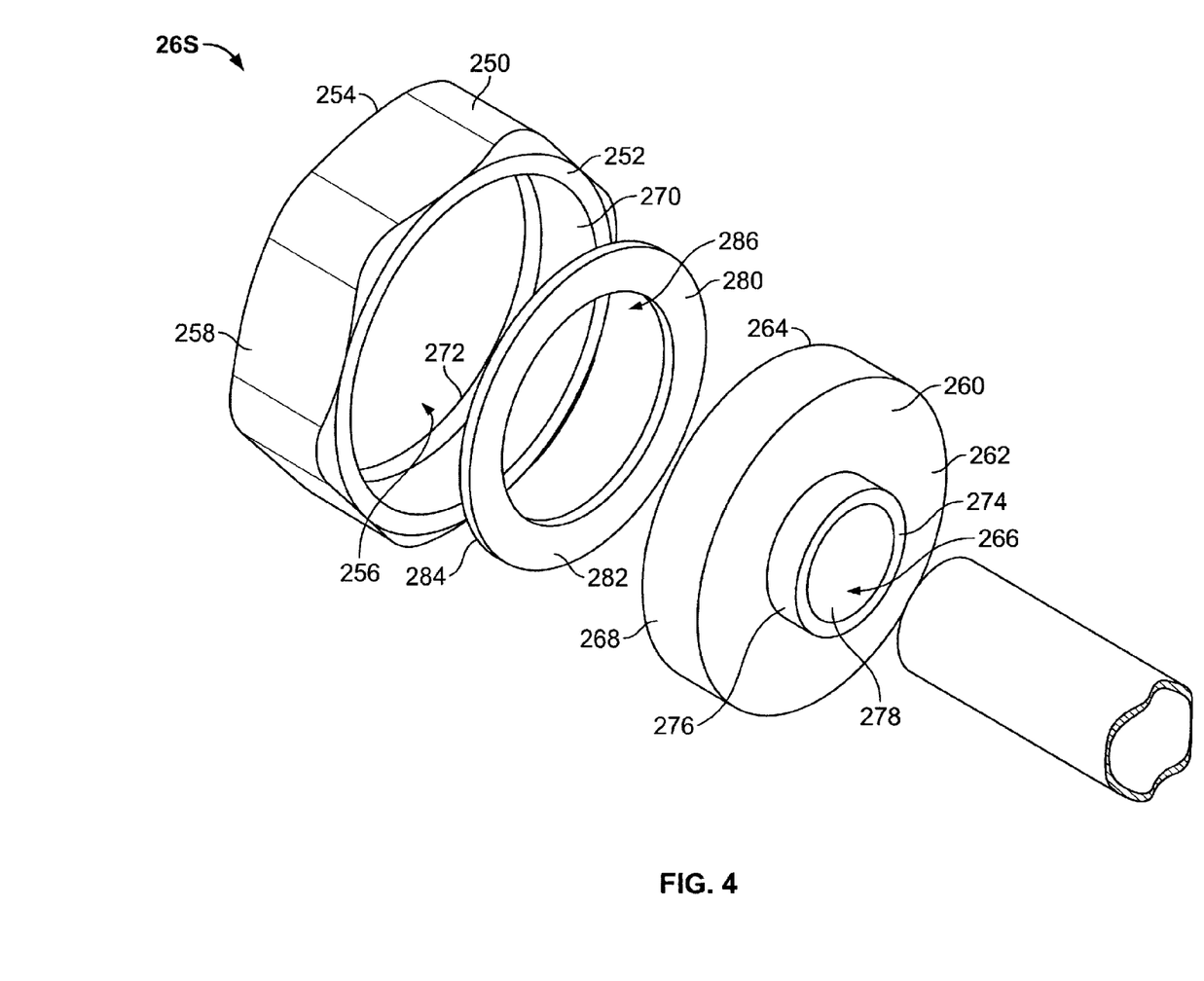
FIG. 4 is an exploded perspective view of an alternative coupling for the coupling system shown in FIGS. 1-3.

FIG. 4 is an exploded perspective view of an alternative fitting assembly 26S for the coupling system 10. The fitting assembly 26S may replace either the fitting assembly 26U or the fitting assembly 28F (shown in FIGS. 1-3), without the need to replace or change the housing 20 and couplings 30 and 32 (shown in FIGS. 1-3). The fitting assembly 26S illustrated in FIG. 4 is a sweat-type fitting assembly and is used when a sweat-type mating joint is provided at either the inlet mating joint 16 or the discharge mating joint 18 (shown in FIG. 1). The description below refers to the fitting assembly 265 replacing the fitting assembly 26U. However, the fitting assembly 26S may replace the fitting assembly 28F in a similar manner.

The sweat-type fitting assembly 26S includes a fitting nut 250 having a first side 252, a second side 254 opposite the first side 252 and an opening 256 extending through the fitting nut 250. The second side 254 generally faces the coupling 30 (shown in FIGS. 2 and 3) and interfaces with the mating interface 62 of the coupling 30 during assembly. The second side 254 is substantially parallel to the first side 252. The fitting nut 250 includes an outer surface 258 having a series of flat portions joined to one another such that the fitting nut 250 has a hexagon shape. The flat portions are used during tightening of the union nut using a tool, such as a wrench.

The sweat-type fitting assembly 26S includes a tail piece 260 having a first side 262, a second side 264 opposite the first side 262 and an opening 266 extending through the tail piece 260. The second side 264 generally faces the coupling 30. The second side 264 is substantially parallel to the first side 262. The tail piece 260 may have a smooth outer surface 268 between the first and second sides 262 and 264. Similarly, the fitting nut 250 has a smooth inner surface 270 surrounding the opening 256. Optionally, the fitting nut 250 may include a lip 272 extending radially inward from the inner surface 270. During assembly of the sweat-type fitting assembly 26S, the tail piece 260 is received within the opening 256 of the fitting nut 250 until the tail piece 260 engages the lip 272. The tail piece 260 is then joined to the fitting nut 250 using chemicals or agents, and by applying heat.

The tail piece 260 includes a junction portion 274 extending from the first side 262. Optionally, the opening 266 may extend through the junction portion 274. The junction portion 274 has a smooth outer surface 276 and a smooth inner surface 278. The junction portion 274 is configured to receive the mating joint 16 in the opening 266 during mating of the inlet pipe 12 with the fitting assembly 26S. Optionally, the opening 266 may include a protrusion extending radially inward that functions as a stop for the mating joint 16. For example, the inlet pipe 12 is inserted into the opening 266 until the mating joint 16 engages the protrusion. The fitting assembly 26S is then joined to the inlet pipe 12 using chemicals or agents, and by applying heat.

The sweat-type fitting assembly 26S includes a gasket 280 having a first side 282, a second side 284 opposite the first side 282 and an opening 286 extending through the gasket 280. The gasket 280 is positioned between the tail piece 260 and the mating interface 62 of the coupling 30. The first side 282 generally faces the second side 264 of the tail piece 260 and the second side 284 generally faces the coupling 30. When assembled, the gasket 280 provides a fluid seal from the fitting assembly 26S to the coupling 30.

Figure 5:
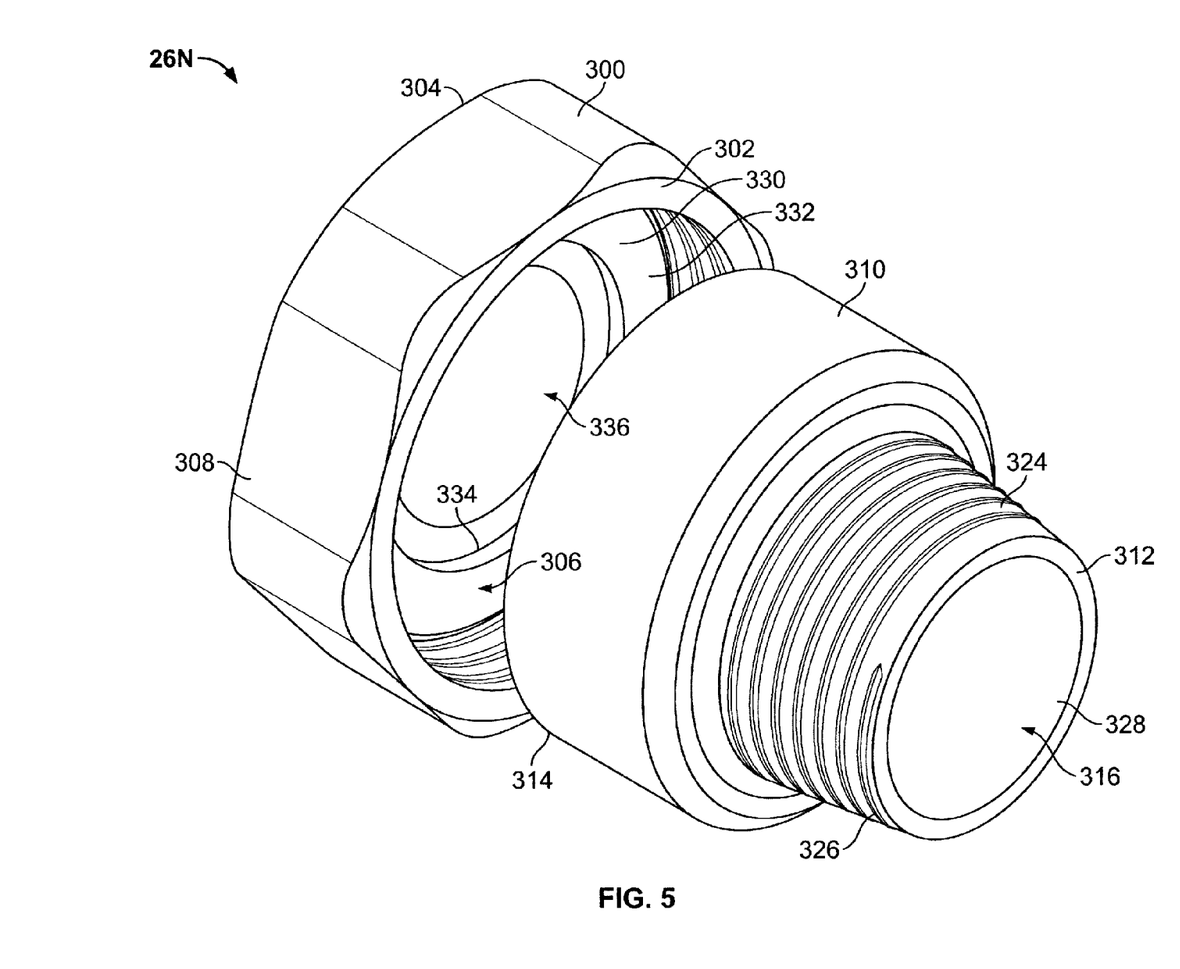
FIG. 5 is an exploded perspective view of another alternative coupling for the coupling system shown in FIGS. 1-3.

FIG. 5 is an exploded perspective view of another alternative fitting assembly 26N for the coupling system 10. The fitting assembly 26N may replace either the fitting assembly 26U or the fitting assembly 28F shown in FIGS. 1-3, without the need to replace or change the housing 20 and couplings 30 and 32. The fitting assembly 26N illustrated in FIG. 5 is an NPT-type fitting assembly and is used when an NPT-type mating joint is provided at either the inlet mating joint 16 or the discharge mating joint 18 (shown in FIG. 1).

The NPT-type fitting assembly 26N includes a fitting nut 300 having a first side 302, a second side 304 opposite the first side 302 and an opening 306 extending through the fitting nut 300. The second side 304 generally faces the coupling 30 (shown in FIGS. 2 and 3) and interfaces with the mating interface 62 of the coupling 30 during assembly. The second side 304 is substantially parallel to the first side 302. The fitting nut 300 includes an outer surface 308 having a series of flat portions joined to one another such that the fitting nut 300 has a hexagon shape. The flat portions are used during tightening of the union nut using a tool, such as a wrench.

The NPT-type fitting assembly 26N includes a tail piece 310 having a first side 312, a second side 314 opposite the first side 312 and an opening 316 extending through the tail piece 310. The second side 314 generally faces the coupling 30. The second side 314 is substantially parallel to the first side 312. Optionally, the tail piece 310 may be coupled to the fitted nut 300 via a sweat-type coupling. Alternatively, the tail piece 310 is coupled to the fitted nut 300 via a threaded-type coupling.

The tail piece 310 includes a threaded junction portion 324 extending from the first side 312. Optionally, the opening 316 may extend through the junction portion 324. The junction portion 324 has a threaded outer surface 326 and a smooth inner surface 328. The junction portion 324 is received within the inlet pipe 12 and threadably coupled thereto during mating of the inlet pipe 12 with the fitting assembly 26N.

The NPT-type fitting assembly 26N includes a gasket 330 having a first side 332, a second side 334 opposite the first side 332 and an opening 336 extending therebetween. The gasket 330 is positioned between the tail piece 310 and the mating interface 62 of the coupling 30. The first side 332 generally faces the second side 314 of the tail piece 310 and the second side 334 generally faces the coupling 30. When assembled, the gasket 330 provides a fluid seal from the fitting assembly 26N to the coupling 30.

Figure 6:
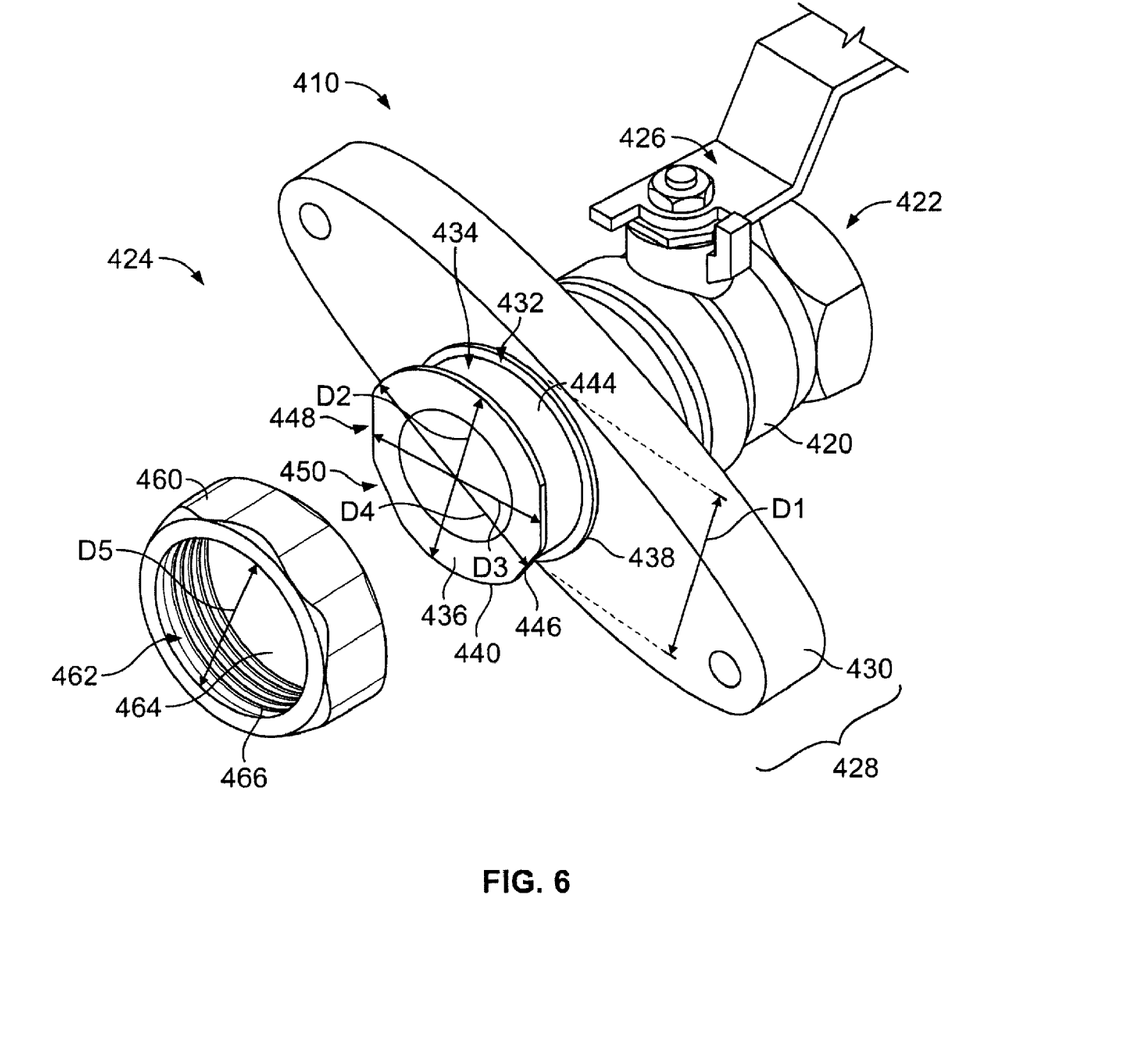
FIG. 6 is a perspective view of an alternative coupling system formed in accordance with an alternative embodiment of the present invention.

FIG. 6 is a perspective view of an alternative universal coupling system 410 formed in accordance with an alternative embodiment of the present invention. The coupling system 410 is used as a component in a fluid distribution system. In the illustrated embodiment, the coupling system 410 is part of a valve equipment system. The coupling system 410 includes a body or housing 420 extending between an inlet side 422 and a discharge side 424. The coupling system 410 includes a valve 426 joined to the housing 420.

A fitting assembly 428 extends from the discharge side 424. The fitting assembly 428 includes a mating flange 430 and a nipple 432. The nipple 432 includes a junction portion 434 extending between the mating flange 430 and a mating interface 436 of the nipple 432. The junction portion 434 includes inner and outer coupler flanges 438 and 440. Optionally, the inner coupler flange 438 is positioned adjacent the mating flange 430. Alternatively, the inner coupler flange 438 may be positioned a distance from the mating flange 430. The inner coupler flange 438 has a circular perimeter that continues without interruption. The perimeter has a diameter D1. The inner coupler flange 438 is spaced apart from the outer coupler flange 440 and a retaining portion 444 is defined therebetween. The retaining portion 444 may receive a captive ring (not shown) similar to the captive rings described above.

The outer coupler flange 440 has a non-circular perimeter. Optionally, the perimeter may be substantially circular but includes discontinuities 446 that form blank areas 448. The circumferential perimeter is generally circular and the discontinuities 446 include at least one flat 450 cut across a portion of the circumferential perimeter to define the corresponding blank area 448. Optionally, the flats 450 may be cut as straight lines. Alternatively, the flats 450 may be arcuate, concave and the like. In the illustrated embodiment, the circumferential perimeter includes multiple flats 450. For example, pairs of flats 450 are cut across different portions of the perimeter to define diametrically opposed blank areas 448. The perimeter has a diameter D2 when measured across a first area that has no discontinuities therein. Optionally, the diameter D2 may be substantially equal to the diameter D1 of the inner coupler flange 438. Alternatively, the diameters D1 and D2 may be different. The perimeter has different diameters D3 or D4 by example, both of which are smaller than the diameter D2 in the first area. The diameters D2 and D3 are measured across the perimeter in different areas that intersect the discontinuities 446.

A fitting member 460 is shown in FIG. 6 tilted at an angle with respect to the mating interface 436 of the nipple 432. The fitting member 460 has an opening 462 extending therethrough. The opening 462 is circular and has a diameter D5 that is less than the diameter D2 of the circumferential perimeter or envelope formed by the outer coupler flange 440. Optionally, the diameter D5 may be taken at a rim or lip 464 at a mating edge of the opening 462. Additionally, the diameters D2 and D3 in areas where discontinuities 446 exist are smaller than the inner diameter D5 of the opening 462 through the fitting member 460. The fitting member 460 is loaded over the outer coupler flange 440 onto junction portion 434 by orienting the fitting member 460 in a non-orthogonal relation with the junction portion 434 such that the outer coupler flange 440 passes through the opening 462. For example, the fitting member 460 may pass over the outer coupler flange 440 at the discontinuities 446. The fitting member 460 includes an interior annular surface 466 that is threaded to form a female union type fitting to be threaded onto a similarly threaded male union fitting. Optionally, the fitting member 460 may have threads on the exterior thereof, to form a male type union. As such, the fitting member 460 is able to connect to a threaded union type of mating joint. Optionally, the inlet side 422 of the coupling system 410 includes an identical type of fitting assembly.

In alternative embodiments, a different type of fitting member 460 may be coupled or joined to the fitting assembly 428, such that the universal coupling system 410 is able to interconnect mating joints that mate with any of a flange fitting, a threaded union fitting, a sweat fitting, an NPT fitting, a barb fitting and the like.

Figure 7:
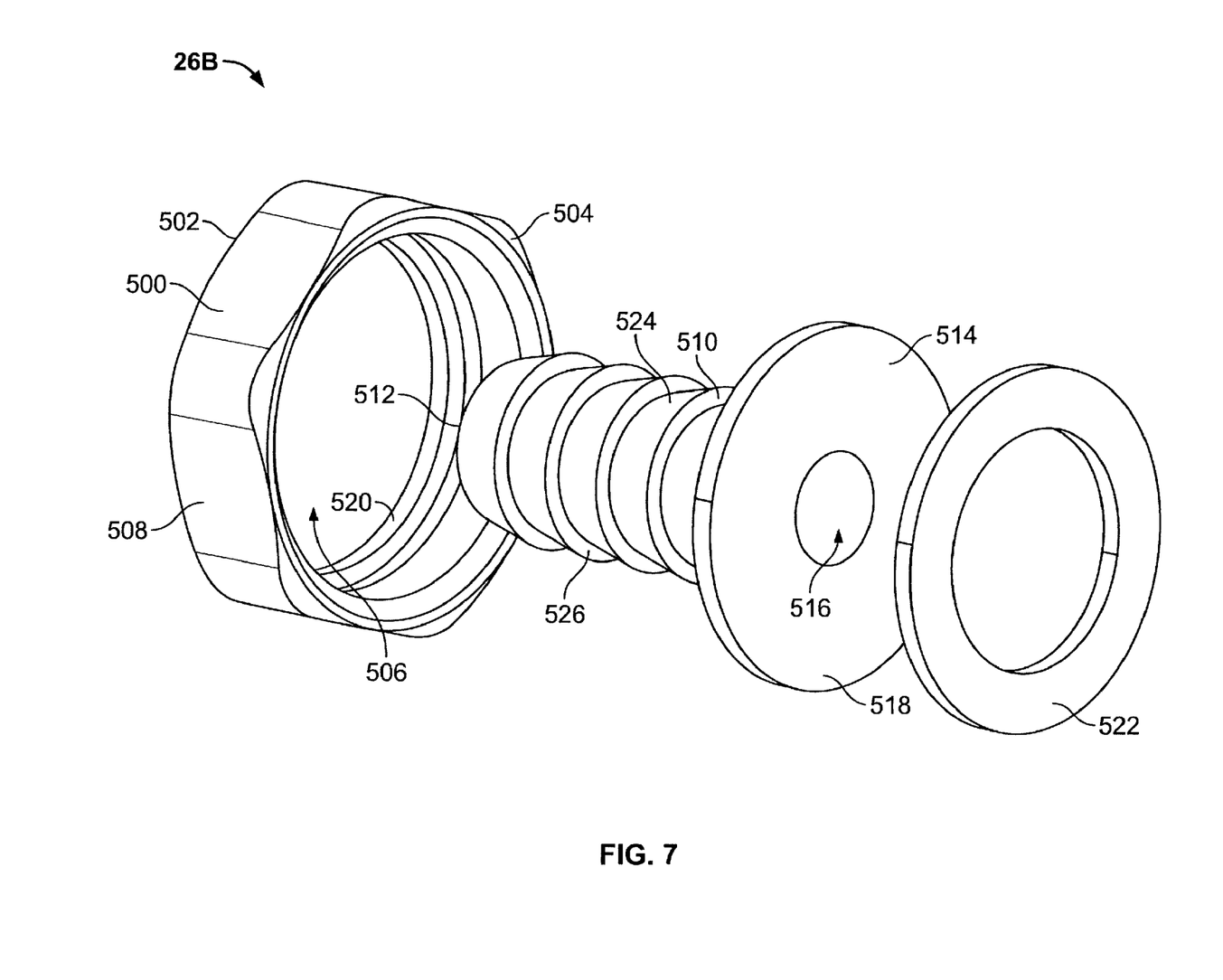
FIG. 7 is an exploded perspective view of another alternative fitting assembly in accordance with an alternative embodiment of the present invention.

FIG. 7 is an exploded perspective view of another alternative fitting assembly 26B for the coupling system 10. The fitting assembly 26B may replace either the fitting assembly 26U or the fitting assembly 28F shown in FIGS. 1-3, without the need to replace or change the housing 20 and couplings 30 and 32. The fitting assembly 26B illustrated in FIG. 7 is a barb-type fitting assembly and is used when a barb-type mating joint is provided at either the inlet mating joint 16 or the discharge mating joint 18 (shown in FIG. 1).

The barb-type fitting assembly 26B includes a fitting nut 500 having a first side 502, a second side 504 opposite the first side 502 and an opening 506 extending through the fitting nut 500. The second side 504 generally faces the coupling 30 (shown in FIGS. 2 and 3) and interfaces with the mating interface 62 of the coupling 30 during assembly. The second side 504 is substantially parallel to the first side 502. The fitting nut 500 includes an outer surface 508 having a series of flat portions joined to one another such that the fitting nut 500 has a hexagon shape. The flat portions are used during tightening of the union nut using a tool, such as a wrench.

The barb-type fitting assembly 26B includes a tail piece 510 having a first side 512, a second side 514 opposite the first side 512 and an opening 516 extending through the tail piece 510. The second side 514 generally faces the coupling 30. The second side 514 is substantially parallel to the first side 512. Optionally, the second side 514 may include a flange 518 extending outward and having a diameter that is substantially equal to the inner diameter of the fitting nut 500. The flange 518 is received within the fitting nut 500 and is retained between a rib 520 at the first side 502 of the fitting nut 500 and the coupling 30. A gasket 522 may be placed between the flange 518 and the coupling 30. When assembled, the gasket 522 provides a fluid seal from the fitting assembly 26N to the coupling 30. Alternatively, the tail piece 510 may be coupled to the fitted nut 500 via a threaded-type coupling, wherein the outer surface of the tail piece 510 is threadably coupled to the inner surface of the fitted nut 500. Alternatively, the tail piece 510 may be coupled to the fitted nut 500 via a sweat-type coupling.

The tail piece 510 includes a barbed junction portion 524 extending from the first side 512. Optionally, the opening 516 may extend through the junction portion 524. The junction portion 524 has a plurality of barbs 526 extending radially outward that may be used during coupling of the tail piece 510 to the mating joint 16 or 18 (shown in FIG. 1). The junction portion 524 is received within the inlet pipe 12 and retained therein during mating of the inlet pipe 12 with the fitting assembly 26B by the barbs 526.

While particular elements, embodiments and applications of the present invention have been shown and described, it will be understood, of course, that the invention is not limited thereto since modifications may be made by those skilled in the art. It is therefore contemplated by the appended claims to cover such modifications that incorporate those features which come within the spirit and scope of the invention.

What is claimed is:

1. A universal coupling assembly, comprising:
   a housing having an inner bore that extends along an axis, the inner bore being in fluid communication with a fluid port of the housing;
   a flange formed integral with the housing and the inner bore, the flange extending radially outward from the axis and having a mating surface, the flange having bolt holes extending therethrough; and
   a nipple extending from the flange along the axis toward the fluid port, the nipple having a mating interface at an end thereof, the nipple further including a junction portion extending at least partially about the nipple and located between the mating interface and the flange,
   wherein in a first configuration, the junction portion and the mating interface receive a flange fitting, wherein bolts are configured to extend between the flange fitting and the flange, the bolts being received in the bolt holes of the flange to couple the flange fitting to the flange when the universal coupling assembly is used in the first configuration; and
   in a second configuration, the junction portion and the mating interface receive one of a threaded union fitting, a sweat fitting, a national pipe thread (NPT) fitting, and a barb fitting.

2. The coupling assembly of claim 1, wherein both the flange and the nipple are integrally formed with the housing.

3. The coupling assembly of claim 1, wherein the junction portion is threaded.

4. The coupling assembly of claim 1, wherein the flange fitting comprises a flange fitting assembly configured to be coupled to at least one of the nipple and the flange.

5. The coupling assembly of claim 4, wherein the flange fitting assembly comprises:
   a fitting flange having a mating surface, an outer surface opposite the mating surface and an opening extending through the fitting flange, the fitting flange being coupled to the flange of the universal coupling assembly;
   a tail piece having a mating surface, an outer surface opposite the mating surface and an opening extending through the tail piece, the tail piece is abuttingly received within the opening of the fitting flange during assembly of the flange fitting assembly such that the mating surfaces of the fitting flange and the tail piece are substantially aligned and the outer surfaces of the fitting flange and the tail piece are substantially aligned;
   a gasket having first and second sides and an opening extending through the gasket, wherein the gasket is sealingly positioned between the mating interface and the mating surface of the tail piece such that the first side faces the mating interface and the second side faces the mating surface of the tail piece.

6. The coupling assembly of claim 1, wherein the threaded union fitting comprises a union fitting assembly configured to be coupled to the nipple.

7. The coupling assembly of claim 6, wherein the union fitting assembly comprises:
   a union nut having a mating surface, an outer surface opposite the mating surface and an opening extending through the union nut, the union nut being coupled to the nipple of the universal coupling assembly;
   a tail piece having a mating surface, an outer surface opposite the mating surface and an opening extending through the tail piece, the tail piece is abuttingly received within the opening of the union nut during assembly of the union fitting assembly;
   a gasket having first and second sides and an opening extending through the gasket, wherein the gasket is sealingly positioned between the mating interface and the mating surface of the tail piece such that the openings are aligned and the first side faces the mating interface and the second side faces the mating surface of the tail piece.

8. The coupling assembly of claim 1, wherein the housing further comprises a cavity, the inner bore being open to the cavity, the coupling assembly further comprising a pump received within the cavity.

9. The coupling assembly of claim 1, wherein the nipple includes external threads axially outward from the flange, the external threads receiving a threaded nut holding the threaded union fitting, the sweat fitting, the NPT fitting, or the barb fitting when the universal coupling assembly is used in the second configuration.

10. A universal coupling assembly for coupling an inlet side mating joint and a discharge side mating joint, the coupling assembly comprising:
    a housing having an inlet side, a discharge side and an inner bore that extends along an axis between an inlet port at the inlet side and a discharge port at the discharge side;
    an inlet side coupling at the inlet side of the housing, the inlet side coupling having an inlet flange formed integral with the housing and the inner bore, the inlet flange extending radially outward from the axis, the inlet side coupling further having an inlet nipple extending from the inlet flange along the axis toward the inlet port and having an inlet mating interface at an end thereof, the inlet mating interface being remote from the inlet flange, the inlet nipple further having an inlet junction portion extending at least partially between the inlet mating interface and the inlet flange, wherein in a first configuration, the inlet junction portion and the inlet mating interface receive a flange fitting, in a second configuration, the inlet junction portion and the inlet mating interface receive one of a threaded union fitting, a sweat fitting, a national pipe thread (NPT) fitting, and a barb fitting; and
    a discharge side coupling at the discharge side of the housing, the discharge side coupling having a discharge flange formed integral with the housing and the inner bore, the discharge flange extending radially outward from the axis, the discharge side coupling further having a discharge nipple extending from the discharge flange along the axis toward the discharge port and having a discharge mating interface at an end thereof, the discharge mating interface being remote from the discharge flange, the discharge nipple further having a discharge junction portion extending at least partially between the discharge mating interface and the discharge flange, wherein in a first configuration, the discharge junction portion and the discharge mating interface receive a flange fitting, in a second configuration, the discharge junction portion and the discharge mating interface receive one of a threaded union fitting, a sweat fitting, an NPT fitting, and a barb fitting.

11. The coupling assembly of claim 10, wherein the inlet side coupling and the discharge side coupling are identically formed.

12. The coupling assembly of claim 10, wherein both the inlet side coupling and the discharge side coupling are integrally formed with the housing.

13. The coupling assembly of claim 10, wherein the inlet and discharge junction portions are threaded.

14. The coupling assembly of claim 10, wherein the flange fitting coupled to at least one of the inlet side coupling or the discharge side coupling comprises a flange fitting assembly configured to be coupled to at least one of the inlet side coupling and the discharge side coupling.

15. The coupling assembly of claim 14, wherein the flange fitting assembly comprises:
a fitting flange having a mating surface, an outer surface opposite the mating surface and an opening extending through the fitting flange, the fitting flange being configured to be coupled to at least one of the inlet side coupling and the discharge side coupling;
a tail piece having a mating surface, an outer surface opposite the mating surface and an opening extending through the tail piece, the tail piece is abuttingly received within the opening of the fitting flange during assembly of the flange fitting assembly such that the mating surfaces of the fitting flange and the tail piece are substantially aligned and the outer surfaces of the fitting flange and the tail piece are substantially aligned;
a gasket having first and second sides and an opening extending through the gasket, wherein the gasket is sealingly positioned between one of the discharge mating interface and the inlet mating interface and the mating surface of the tail piece such that the first side faces the mating interface and the second side faces the mating surface.

16. The coupling assembly of claim 10, wherein the threaded union fitting coupled to at least one of the inlet side coupling or the discharge side coupling comprises a union fitting assembly configured to be coupled to at least one of the inlet side coupling and the discharge side coupling.

17. The coupling assembly of claim 16, wherein the union fitting assembly comprises:
a union nut having a mating surface, an outer surface opposite the mating surface and an opening extending through the union nut, the union nut being configured to be coupled to at least one of the inlet nipple and the discharge nipple;
a tail piece having a mating surface, an outer surface opposite the mating surface and an opening extending through the tail piece, the tail piece is abuttingly received within the opening of the union nut during assembly of the union fitting assembly;
a gasket having first and second sides and an opening extending through the gasket, wherein the gasket is sealingly positioned between one of the discharge mating interface and the inlet mating interface and the mating surface of the tail piece such that the openings are aligned and the first side faces the mating interface and the second side faces the mating surface of the tail piece.

18. The coupling assembly of claim 10, wherein the housing further comprises a cavity, the inner bore being open to the cavity, the coupling assembly further comprising a pump received within the cavity.

19. A method of configuring a universal coupling assembly for installation into a fluid distribution system having a mating joint of a predetermined type of coupling, the method comprising:
providing a housing having an inner bore that extends along an axis through a fluid port;
providing a universal coupling on the housing, wherein the universal coupling includes a flange integrally formed with the housing and extending radially outward from the axis, the flange having bolt holes therethrough, and wherein the universal coupling includes a nipple extending from the flange along the axis toward the fluid port, wherein the nipple includes a mating interface at an end thereof, the nipple further includes a junction portion extending at least partially between the mating interface and the flange, the junction portion and the mating interface being configured to receive at least two different types of interchangeable fittings selected from the group comprising a flange fitting, a threaded union fitting, a sweat fitting, a national pipe thread (NPT) fitting, and a barb fitting;
in a first configuration, mounting the flange fitting to the universal coupling using bolts extending between the flange fitting and the flange, the bolts being received in the bolt holes of the flange to couple the flange fitting to the flange when the universal coupling assembly is used in the first configuration; and
in a second configuration, mounting one of the threaded union fitting, the sweat fitting, the national pipe thread (NPT) fitting, or the barb fitting to the universal coupling.

20. The method of claim 19, wherein the universal coupling defines a first universal coupling, the method further comprising:
providing a second universal coupling on the housing, the second universal coupling being substantially identical to the first universal coupling, the second universal coupling able to receive at least two different types of interchangeable fittings selected from the group comprising a flange fitting, a threaded union fitting, a sweat fitting, an NPT fitting, and a barb fitting;
selecting a second interchangeable fittings based on the type of mating joint used in the fluid distribution system, wherein the second interchangeable fitting is different than the other interchangeable fitting; and
mounting the second interchangeable fitting to the second universal coupling.

21. The method of claim 19, wherein the universal coupling defines a first universal coupling and wherein the interchangeable fitting defines a first interchangeable fitting of a first type, the method further comprising:
providing a second universal coupling on the housing, the second universal coupling being substantially identical to the first universal coupling, the second universal coupling being configured to receive at least two different types of interchangeable fittings selected from the group comprising a flange fitting, a threaded union fitting, a sweat fitting, an NPT fitting, and a barb fitting;

selecting a second interchangeable fittings based on the type of mating joint used in the fluid distribution system, wherein the second interchangeable fitting is substantially identical to the first interchangeable fitting; and
mounting the second interchangeable fitting to the second universal coupling.

22. A universal coupling assembly, comprising:
a housing having an inner bore that extends along an axis, the inner bore being in fluid communication with a fluid port of the housing;
a flange formed integral with the housing and the inner bore, the flange extending radially outward from the axis and having a mating surface; and
a nipple extending from the flange along the axis toward the fluid port, the nipple having a mating interface at an end thereof, the nipple further including a junction portion extending at least partially about the nipple and located between the mating interface and the flange,
wherein in a first configuration, the junction portion and the mating interface receive a flange fitting;
in a second configuration, the junction portion and the mating interface receive a threaded union fitting;
in a third configuration, the junction portion and the mating interface receive a sweat fitting;
in a fourth configuration, the junction portion and the mating interface receive a national pipe thread (NPT) fitting; and
in a fifth configuration, the junction portion and the mating interface receive a barb fitting.

23. The coupling assembly of claim 22, wherein the flange includes bolt holes extending therethrough, the bolt holes receiving bolts therethrough to couple the flange fitting to the flange when the universal coupling assembly is used in the first configuration, and wherein the nipple includes external threads axially outward from the flange, the external threads receiving a threaded nut holding the threaded union fitting when the universal coupling assembly is used in the second configuration, the threaded nut holding the sweat fitting when the universal coupling assembly is used in the third configuration, the threaded nut holding the NPT fitting when the universal coupling assembly is used in the fourth configuration, or the threaded nut holding the barb fitting when the universal coupling assembly is used in the fifth configuration.

* * * * *